Figure 1:
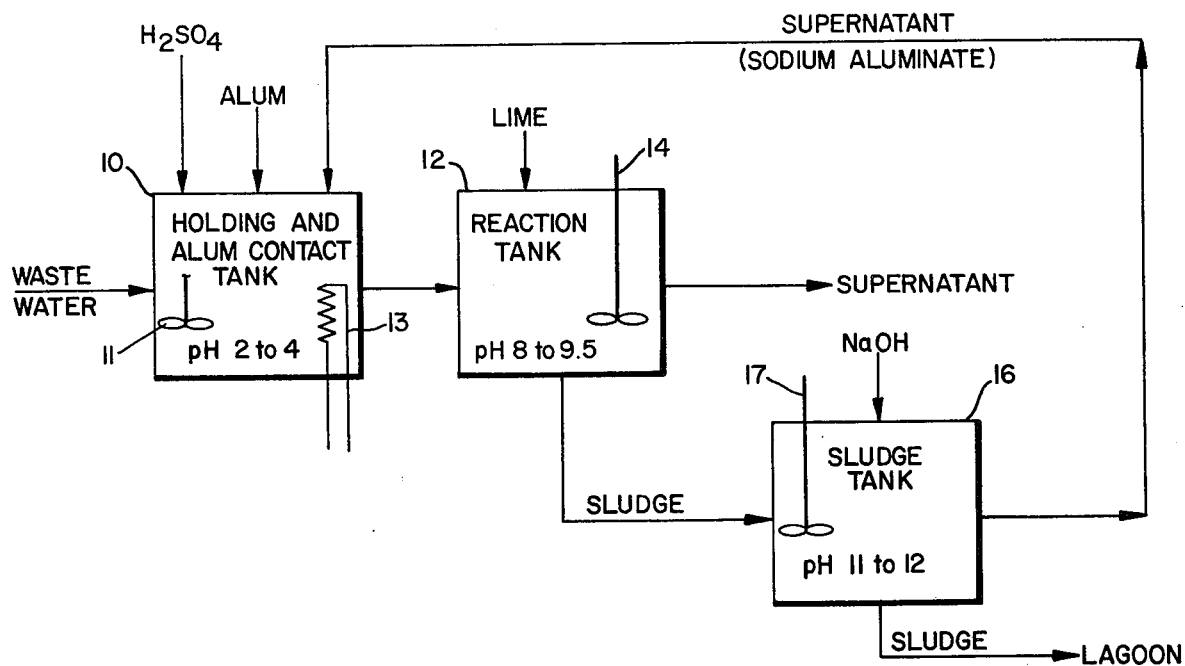

United States Patent [19]

Singh

[11] 3,959,132

[45] May 25, 1976

[54] METHODS FOR REMOVING FLUOBORATES FROM AQUEOUS MEDIA

[75] Inventor: Jaswant Singh, East Syracuse, N.Y.

[73] Assignee: Galson Technical Services, Inc., East Syracuse, N.Y.

[22] Filed: Oct. 25, 1974

[21] Appl. No.: 517,964

[52] U.S. Cl. ................................... 210/45; 210/51;
210/53; 210/56; 134/13
[51] Int. Cl.² .......................................... C02B 1/20
[58] Field of Search .................. 210/42, 45, 47, 46,
210/49, 50, 51, 52, 53, 60, 59, 61; 156/19;
252/79.3; 134/13, 10; 423/293, 489, 490,
464, 158, 159

[56] References Cited
UNITED STATES PATENTS

| | | | |
|---|---|---|---|
| 3,284,350 | 11/1966 | Williamson | 210/46 |
| 3,575,853 | 4/1971 | Gaughan et al. | 210/50 |
| 3,575,854 | 4/1971 | Richards | 210/50 |
| 3,740,363 | 6/1973 | Fuller | 210/45 |
| 3,800,024 | 3/1974 | Forsell et al. | 210/42 |

FOREIGN PATENTS OR APPLICATIONS 1,136,456  12/1968  United Kingdom

OTHER PUBLICATIONS

Fulton G.P. "Alum Recovery for Filtration Plant", Water and Wastes Engineering, June, 1970, (78–81).

*Primary Examiner*—Thomas G. Wyse
*Assistant Examiner*—Benoit Castel
*Attorney, Agent, or Firm*—Strauch, Nolan, Neale, Nies & Kurz

[57] ABSTRACT

A method of removing fluoborates from aqueous media in which the compounds are hydrolyzed to fluorides and the fluorides precipitated.

10 Claims, 2 Drawing Figures

METHODS FOR REMOVING FLUOBORATES FROM AQUEOUS MEDIA

This invention relates to novel methods for removing fluoborates from aqueous media.

Lead and tin fluoborates and fluoboric acid are widely used in lead and tin plating processes and appear as contaminants in the water used to rinse the plated parts. (The term "fluoborates" as used hereinafter and in the appended claims is intended to include fluoboric acid). At the present time there is no satisfactory method for removing these contaminants, and the problem is a difficult one because the appreciable solubility of fluoborates in aqueous media makes it impossible to precipitate them on anything approaching a quantitative basis. For example, the least soluble of the fluoborates, potassium fluoborate, is soluble in water to the extent of 4.4 grams per liter.

Sheer volume contributes to the magnitude of the problem. A plating operation can generate 50,000–100,000 gallons or more of fluoborate contaminated waste water daily.

I have now unexpectedly discovered that fluoborates can be rapidly and efficiently removed from aqueous media by first hydrolyzing the fluoborates to fluorides with aluminum or an aluminum salt and then reacting the resulting fluorides with a calcium salt. This converts the fluorides to calcium fluoride, which is sparingly soluble and accordingly precipitates and can be readily separated from the aqueous liquid.

That I can make the hydrolysis reactions proceed at a sufficiently rapid rate for the process to be practical is surprising as well as important. It is known that fluoborates will undergo hydrolysis in aqueous solutions (see, for example, G. Ryss, "The Chemistry of Fluorine and its Inorganic Compounds", Moscow, State Publishing House for Scientific, Technical, and Chemical Literature (distributed by the Clearinghouse for Federal and Technical Information), 1956, p. 21). However, the slow rates at which it has heretofore been possible to make such reactions proceed require retention times which are impractically long for waste water treatment and comparable processes. For example, a study by C. A. Wamser (J. Am. Chem. Soc., 70, p. 1209, 1948) showed that, at 25° C., a 0.001 molar aqueous solution of fluoboric acid requires two months to reach equilibrium and that, even then, the degree of hydrolysis is only 77.7 percent. The speed and degree of hydrolysis are still lower for the higher concentrations of fluoborates which can be encountered in waste water from plating operations for example.

In contrast to what Wamser obtained, I am, as an example, able to decompose a more concentrated 0.005 molar aqueous solution of the less hydrolyzable sodium fluoborate to one which is less than 0.001 molar in only four hours. The reduction in the fluoborate concentration was from 549 to 10.98 mg/liter. Or, stated otherwise, 98 percent of the fluoborate was hydrolyzed to the corresponding fluoride in this short period.

The form in which the aluminum is added to the aqueous liquid to be treated can be varied. For example, I may use filings or other finely divided aluminum metal particles or a salt such as aluminum chloride or sulfate. Other compounds which can be used to advantage because they are both efficient and inexpensive are those hydrated salts of aluminum and a monovalent metal (generally potassium) known by the generic name alum; that is, compounds of the formula $M_2SO_4 \cdot Al_2(SO_4)_3 \cdot NH_2O$ where M is monovalent and generally potassium and N is typically 18–24.

Though I do not wish to be bound to any particular theory, it appears that there is an exchange of fluorine atoms between the boron in the fluoborate(s) and the aluminum of the additive I employ in carrying out the hydrolysis step of my novel process. This results in the formation of stable complexes with aluminum to fluorine bonds which can be disassociated in a subsequent step, allowing the fluoride to be precipitated.

Aluminum sulfate has, in this regard, heretofore been employed in other waste water treatments. In these, however, it has been employed for a completely different purpose — as a coagulant.

In the first step of my novel process, the aluminum or aluminum salt is added to the liquid to be treated at a low pH (preferably in the range of 2 to 4). Aqueous media contaminated with fluoborates may have a pH in this range. This makes it unnecessary to adjust the pH, which enhances the appeal of my novel process. And, even if a pH adjustment is necessary, this can be easily and economically accomplished simply by adding sulfuric or other acids to the liquid being treated.

The amount of aluminum ion furnishing additive employed can be varied to provide aluminum ions in amounts varying from 0.5 to 2 ppm per 1 ppm of fluoborate with the larger amounts often being preferred because the hydrolysis of the fluoborates is a function of the aluminum ion concentration.

If alum is employed, as it will typically be because of its relatively low cost, from 10–20 ppm of alum per one ppm of fluoride ion will optimally be added, depending upon the concentration of fluoride ions in the liquid being treated. Larger amounts of the compound are used for higher fluoride concentrations.

Heat will speed the decompositions of the fluoborates. While temperatures as high as boiling can theoretically be employed to advantage, about 175°–180° F. is the highest which is useful from a practical viewpoint.

At room temperature (70° F.) and with reasonable concentrations of aluminum ion, the hydrolysis of the fluoborates can be completed in 4 to 8 hours. Ninety-five percent or more of the fluoborate will have decomposed by then.

In a subsequent step, the pH of the liquid being treated is raised to 8.0–9.5 (and preferably to about 9), and calcium ions are added. Both of these objectives can be easily and economically realized by adding lime to the aqueous media. The amount of lime I employ is simply that needed to raise the pH to the selected level. This will insure that adequate calcium ions are present.

The increase in pH is, as suggested above, believed to result in disassociation of the aluminum, fluorine bonds in the fluoride complexes formed by the decomposition of the fluoborates. This liberates fluoride ions which react with the calcium ions to form the insoluble compound calcium fluoride. This compound precipitates as a sludge from which the essentially fluoborate free, aqueous supernatant can be readily separated — for example, by simply discharging it from the tank or other vessel in which the reactions are carried out.

The conversion of the fluorides to calcium fluoride will typically be completed in a period of 5–30 minutes depending upon the form in which the lime is added. The reactions will proceed much more rapidly if a slurry is employed rather than a dry powder, for example.

Other compounds capable of contributing calcium ions to the precipitation reactions can be employed, if desired. However, as indicated above, lime is preferred because it also produces the desired elevation of pH. Furthermore, lime is an inexpensive source of calcium ion.

The aluminum added in my process to bring about the decomposition of the fluorides can, in an optional step, readily be reclaimed and recycled. This feature is also important from the economic point-of-view.

From the foregoing it will be apparent to the reader that one primary and important object of my invention resides in the provision of a novel and practical method for removing fluoborates from electroplating process waste waters and from other aqueous media.

Another important and primary object of my invention resides in the provision of novel, improved processes for hydrolyzing fluoborates which make it possible to effect such reactions much faster than has heretofore been possible.

Other also important but more specific objects of the invention reside in the provision of processes in accord with one or both of the preceding objects:

1. which can be practiced at modest cost;
2. which are efficient;
3. which can be carried out in periods of time short enough to make the processes practical for commercial scale operations;
4. in which aluminum or an aluminum salt is employed to accelerate the hydrolysis of the fluoborates;
5. in which the fluoride ions present in the fluoborates are converted to the insoluble calcium salt which accordingly precipitates and thus makes the fluoride readily separable from the aqueous medium being treated;
6. which have various combinations of the foregoing features and attributes.

Figure 2:
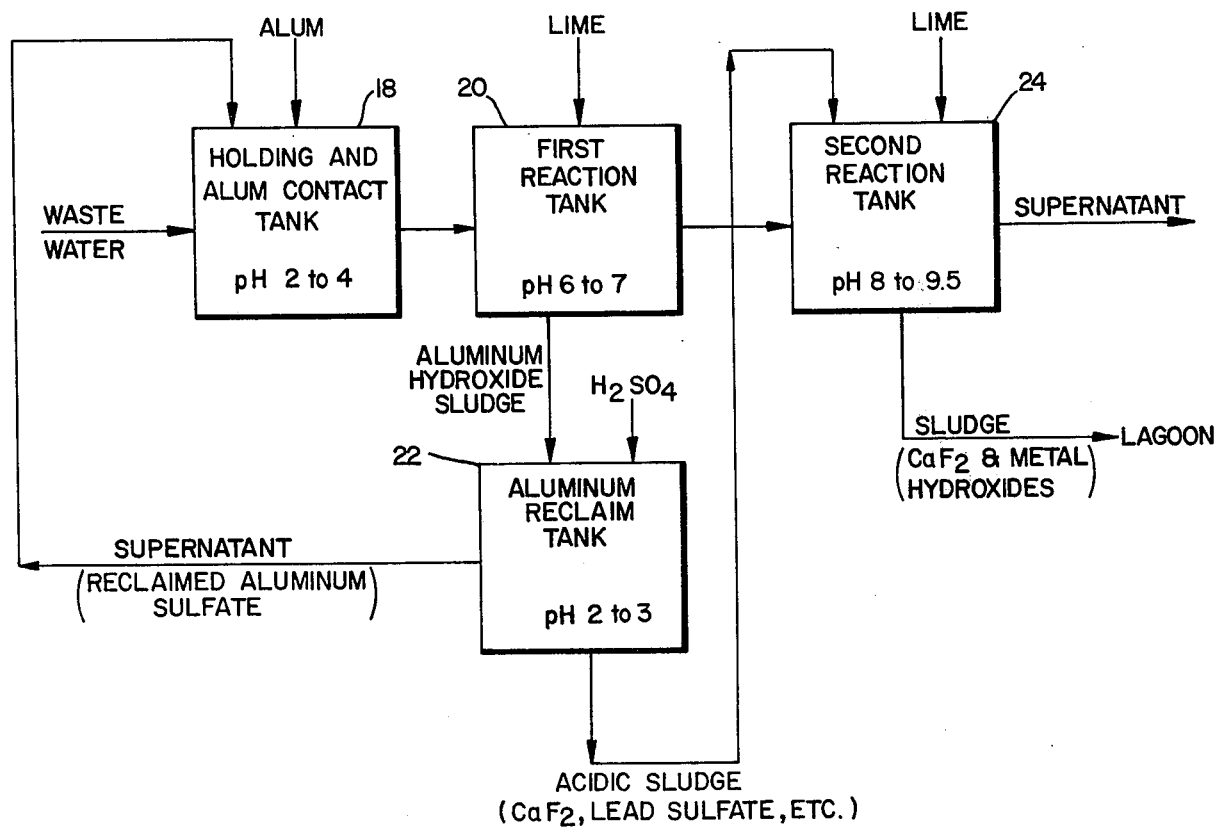

Other important objects and features and additional advantages of my invention will become apparent from the appended claims and as the ensuing detailed description and discussion proceeds in conjunction with the accompanying drawing, in which:

FIG. 1 is a flow diagram of a process for removing fluoborates from aqueous media in accord with the principles of the present invention and for recovering aluminum employed in the process; and FIG. 2 is a similar flow diagram showing a different technique for recovering the aluminum.

FIG. 1 depicts one exemplary system in accord with the principles of the present invention for removing fluoborates from waste waters and other aqueous media. The waste water to be treated is introduced into a holding tank 10 equipped with an agitator 11 along with alum in the proportions identified above and with whatever agitation may be necessary to produce uniform dispersion of the alum. Sulfuric acid or other acidic material is also introduced into holding tank 10, if necessary, to adjust the pH of the solution in the holding tank to between 2 and 4.

The solution is held in tank 10 for a period of 4–8 hours. At the end of this period the hydrolysis or decomposition reactions will be essentially complete (the holding time can be reduced by employing an electrical resistance heater 13 or other heating device to elevate the temperature of the holding tank contents and speed the decomposition reactions).

The contents of holding tank 10 are then transferred to a reaction tank 12. Lime is also added to reaction tank 12 until the pH of its contents has been raised to the selected level in the 8.0–9.5 range.

Reaction tank 12 is preferably equipped with a two-speed agitator 14. Initially, the agitator is operated at high speed to thoroughly mix the contents of tank 12. Thereafter, the mixture is slowly stirred. This promotes floc formation and drives the precipitation reactions toward completion.

In tank 12 the fluorides produced by hydrolysis in holding tank 10 react with the calcium in the lime and precipitate as calcium fluoride. The aluminum precipitates as aluminum hydroxide; and tin, lead, copper, and any other heavy metals present in the mixture also precipitate, forming a sludge. The sludge is allowed to settle and the clear supernatant is discharged. The fluoride content of the supernatant will typically be found to be at least 95 percent lower than that of the liquid supplied to holding tank 10.

The sludge can be lagooned, dewatered, or otherwise processed in a conventional manner. Alternatively, if the initial fluoborate content was high and large amounts of aluminum are therefore present in the sludge, the sludge can be processed to recover the aluminum.

This may be accomplished by transferring the sludge to a sludge tank 16 equipped with an agitator 17. Here, a dilute solution of sodium hydroxide is added with agitation until the pH in sludge tank 16 reaches a level of 11 to 12.

At this pH, the calcium fluoride remains insoluble but the aluminum hydroxide dissolves, forming a solution of sodium aluminate supernatant. This supernatant can be recycled to holding tank 10 to provide aluminum for hydrolyzing the fluoborates.

An acidic material such as sulfuric acid will typically have to be added in this event to decrease the pH in holding tank 10 to the desired level.

The sludge remaining in sludge tank 16 after the removal of the sodium aluminate supernatant is treated as suggested above.

FIG. 2 illustrates a second system in accord with the principles of the present invention for removing fluoborates from aqueous media and for recovering the aluminum employed in the process. The system shown in FIG. 2 includes a holding tank 18. Here, as in the holding tank 10 shown in FIG. 1, the waste is contacted with alum to hydrolyze the fluoborates in it to the corresponding fluorides.

After the decomposition reactions have gone essentially to completion, the contents of tank 18 are transferred to reaction tank 20. Lime is added until the pH in tank 20 is increased to between 6 and 7.

At this pH, the aluminum present in the contents of the tank precipitates as aluminum hydroxide. Partial precipitation of the fluorides as calcium fluoride also occurs with the fluorides perhaps being adsorbed on the heavy, flocculent, aluminum hydroxide precipitate.

The sludge formed in tank 20 is transferred to an aluminum reclaim tank 22 and the supernatant is transferred to a second reaction tank 24.

Sulfuric acid (or other acidic material) is added to the contents of aluminum reclaim tank 22 to lower the pH to between 2 and 3. At this pH, the aluminum hydroxide reacts with the acid to form aluminum sulfate. This is recycled to holding tank 18 along with the small amount of fluoride which the supernatant will contain (about 5 percent by weight).

An acidic sludge composed of calcium fluoride, sulfates of lead and other heavy metals, etc. remains in tank 22 after the aluminum sulfate solution is discharged. This sludge is also transferred to reaction tank 24.

Lime is then added to the contents of the second reaction tank 24 to raise the pH to a level between 8 and 9.5. Additional fluorides precipitate as calcium fluoride along with any remaining heavy metals.

After the reactions in tank 24 are completed, the supernatant is discharged and the sludge processed.

Although not shown, tanks 18, 20, 22, and 24 of the system just described can be equipped with agitators so that the materials introduced into these tanks can be thoroughly mixed to promote the reactions which are carried out in them. Also, any of the tanks of this system, especially holding tank 18, as well as tanks 12 and 16 in the system shown in FIG. 1 can, if desired, be equipped with heating devices.

The efficacy of my novel process for removing fluoborates from aqueous media is demonstrated by the following example:

A 500 milliliter sample of waste water from an electroplating operation was found with a $BF_4^-$ ion specific electrode and an expanded scale Ph meter to have a 760 ppm concentration of fluoride ion in the form of fluoborates and 135 ppm of free fluoride. Powdered alum ($K_2SO_4 \cdot Al_2(SO_4)_3 \cdot 18H_2O$) was added to this sample in a beaker with stirring and at room temperature in the amount of 20 ppm of alum per 1 ppm of fluoride. The contents of the beaker were allowed to stand 5 hours and then transferred to a second beaker.

Slurried lime was added to the contents of the second beaker with stirring until the pH reached a level of 8.8. The contents of the second beaker were allowed to stand for 2 hours.

The supernatant was then decanted and its fluoride content ascertained by the technique described above. It was found to have been reduced by approximately 97.5 percent to only 24 ppm.

While my novel process can be employed to particular advantage in the removal of fluoborates from the waste waters generated in electroplating, this is by no means its only application. The process is generally applicable to the removal of fluoborates from aqueous media. Furthermore, the hydrolysis step is, in itself, useful and can be employed in processes where it is desired to effect a conversion of fluoborates to fluorides, irrespective of whether or not the fluorides are to then be removed from the media being treated.

The invention may be embodied in forms other than those described above without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

What is claimed and desired to be secured by Letters Patent is:

1. A method for removing from an aqueous medium one or more fluoborate compounds dissolved in the medium, said method comprising the steps of: hydrolyzing said fluoborates by adding to the medium at a pH in the range of 2 to 4 an additive capable of furnishing aluminum ions at a rate varying from 0.5 to 2 ppm of aluminum ion per one ppm of fluoborate ion in an amount sufficient to convert the fluoborates to compounds from which fluorides can be precipitated; thereafter adding to the aqueous medium a material capable of furnishing calcium ions to the medium, said material being added in an amount sufficient to raise the pH of the medium to in the range of 8 to 9.5, thereby freeing fluoride ions from the hydrolysis products in an environment in which they will react with the calcium ions to form a precipitate; and separating the precipitate and supernatant to thereby free the aqueous medium of the fluorine-containing compound or compounds.

2. A process as defined in claim 1 in which alum is employed as the source of aluminum ion in the hydrolysis step and in which the alum is added to the aqueous medium being treated in a proportion of about 10–20 ppm of alum per one ppm of fluoride ion in the medium being treated.

3. A process as defined in claim 1 in which, in the hydrolysis step, the liquid medium being treated is heated to a temperature not higher than 180° F.

4. The method of claim 1 wherein the calcium ions are introduced into the liquid medium being treated and the pH of said liquid increased by adding lime thereto.

5. A process as defined in claim 1 in which any aluminum present in the precipitate in an insoluble form is recovered by adding an aqueous solution of a basic compound to said precipitate in an amount sufficient to raise the pH of the precipitate to in the range of 11 to 12 and thereby convert the aluminum to a soluble form and then separating the aluminum ion containing supernatant from the precipitate.

6. A process as defined in claim 5 in which the compound added to the precipitate is sodium hydroxide.

7. A process as defined in claim 5 wherein the aluminum recovered from the precipitate is added to the liquid medium being treated in the hydrolysis step and wherein an acidic material is also added to the liquid medium being treated in the hydrolysis step in an amount sufficient to lower the pH of said liquid medium to between 2 and 4.

8. A process as defined in claim 1 in which the aluminum is recovered, after the step of hydrolyzing the fluoborate compound or compounds, by increasing the pH of the aqueous medium being treated to between 6 and 7 to precipitate the aluminum as aluminum hydroxide and then separating the precipitate from the aqueous medium.

9. A process as defined in claim 8 together with the step of reacting the aluminum hydroxide with an acidic material to form an aluminum salt and wherein it is said aluminum salt that is added to the liquid being treated to accelerate the hydrolysis of the fluoborate.

10. A process as defined in claim 9 in which the acidic material is sulfuric acid and the aluminum salt is therefore an aluminum sulfate.

* * * * *